United States Patent
West et al.

(10) Patent No.: US 11,724,568 B2
(45) Date of Patent: Aug. 15, 2023

(54) TEMPERATURE REGULATING SYSTEM FOR VEHICLE INTERIOR SURFACES

(71) Applicant: Ford Global Technologies, LLC, Dearborn, MI (US)

(72) Inventors: Sean Bayle West, Monroe, MI (US); Benjamin Yilma, Canton, MI (US); Steven Nicholas Fidh, Ann Arbor, MI (US); Dylan Mandelbaum, Mountain View, CA (US); Andres Almeida Senatore, San Jose, CA (US); Otis Allen, Soquel, CA (US); Siddharthan Selvasekar, Livermore, CA (US); Sydney Puckett, Detroit, MI (US); Michael Steven Medoro, Sunnyvale, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 59 days.

(21) Appl. No.: 17/115,937

(22) Filed: Dec. 9, 2020

(65) Prior Publication Data
US 2022/0176782 A1   Jun. 9, 2022

(51) Int. Cl.
*B60H 1/00* (2006.01)

(52) U.S. Cl.
CPC ..... *B60H 1/00878* (2013.01); *B60H 1/00285* (2013.01); *B60H 1/00292* (2013.01); *B60H 1/00871* (2013.01)

(58) Field of Classification Search
CPC ............ B60H 1/00292; B60H 1/00295; B60H 1/00285; B60H 1/00735; B60H 1/00871;
(Continued)

(56) References Cited

U.S. PATENT DOCUMENTS

| 4,562,957 A | * | 1/1986 | Nakagawa | ............ B60H 1/2225 |
| | | | | 219/202 |
| 4,997,053 A | * | 3/1991 | Drori | ..................... B62D 1/181 |
| | | | | 180/289 |

(Continued)

FOREIGN PATENT DOCUMENTS

| CA | 2845960 A1 | * | 9/2014 | ......... B60H 1/00657 |
| DE | 102007021907 A1 | * | 12/2007 | ............. B62D 1/183 |

(Continued)

OTHER PUBLICATIONS

DE 10002286 B4 English Machine Translation (Year: 2009).*

*Primary Examiner* — Jenna M Hopkins
(74) *Attorney, Agent, or Firm* — Vichit Chea; Price Heneveld LLP

(57) ABSTRACT

A temperature regulating system for interior surfaces of a vehicle includes a heating, ventilation, and air conditioning system. An air register assembly is operably coupled to the heating, ventilation, and air conditioning system to direct air to an interior compartment. The air register assembly includes an actuation assembly for adjusting a position of the air register assembly. A target feature having a contact surface is disposed within the interior compartment. A temperature sensor is coupled to the target feature and senses a surface temperature of the contact surface. A controller communicates a notification with temperature information. A remote start device is communicatively coupled with the controller. The controller adjusts the position of the air register assembly to direct air across the contact surface of the target feature in response to a remote start signal from the remote start device.

20 Claims, 9 Drawing Sheets

(58) Field of Classification Search
CPC .......... B60H 1/00878; B60H 2001/003; B62D 1/181; B62D 1/183; B62D 1/185; B62D 1/187; B62D 1/065; B60R 16/037
See application file for complete search history.

(56) References Cited

U.S. PATENT DOCUMENTS

| | | | | |
|---|---|---|---|---|
| 6,012,297 | A * | 1/2000 | Ichishi | B60H 1/00871 165/203 |
| 8,993,929 | B2 | 3/2015 | Maranville et al. | |
| 9,150,238 | B2 | 10/2015 | Alcazar et al. | |
| 2006/0286918 | A1 * | 12/2006 | Vargas | F24F 13/06 454/155 |
| 2007/0243810 | A1 * | 10/2007 | Browne | B60H 1/3421 454/155 |
| 2008/0003938 | A1 * | 1/2008 | Baruschke | B60H 1/345 454/143 |
| 2008/0248736 | A1 * | 10/2008 | Aoki | B60H 1/00742 454/75 |
| 2009/0318069 | A1 | 12/2009 | Konet | |
| 2011/0272131 | A1 * | 11/2011 | Mikat | B60H 1/00742 236/91 C |
| 2014/0087644 | A1 | 3/2014 | Watanabe et al. | |
| 2015/0197135 | A1 | 7/2015 | Chen et al. | |
| 2016/0368519 | A1 * | 12/2016 | Stefan | B62D 1/065 |
| 2017/0072966 | A1 * | 3/2017 | Bolger | B60H 1/00971 |
| 2017/0330044 | A1 * | 11/2017 | Telpaz | G05D 1/0088 |
| 2018/0229585 | A1 * | 8/2018 | Fidh | B60H 1/00871 |
| 2019/0322154 | A1 * | 10/2019 | Ganguly | B60H 1/00742 |
| 2020/0062076 | A1 * | 2/2020 | Elson | B60H 1/00735 |
| 2020/0164722 | A1 * | 5/2020 | Baker | B60H 1/3442 |
| 2021/0061056 | A1 * | 3/2021 | Dudar | B60H 1/00735 |

FOREIGN PATENT DOCUMENTS

| | | | | |
|---|---|---|---|---|
| DE | 10002286 | B4 * | 6/2009 | ......... B60H 1/00285 |
| DE | 102014206215 | A1 * | 10/2015 | ......... B60H 1/00292 |
| DE | 102016117144 | A1 * | 3/2017 | ......... B60H 1/00271 |
| DE | 102019122398 | A1 * | 2/2020 | ......... B60H 1/00657 |
| EP | 0992416 | A2 | 4/2000 | |
| EP | 1535768 | A2 * | 6/2005 | ......... B60H 1/00857 |
| EP | 3613628 | A1 * | 2/2020 | ............. B60H 1/00 |
| WO | 0128842 | A1 | 4/2001 | |
| WO | WO-2007012454 | A1 * | 2/2007 | ......... B60H 1/00871 |
| WO | WO-2015149674 | A1 * | 10/2015 | ......... B60H 1/00292 |
| WO | WO-2016070047 | A1 * | 5/2016 | ......... B60H 1/00271 |
| WO | WO-2020108856 | A1 * | 6/2020 | ......... B60H 1/00357 |

\* cited by examiner

TEMPERATURE REGULATING SYSTEM FOR VEHICLE INTERIOR SURFACES

FIELD OF THE DISCLOSURE

The present disclosure generally relates to a temperature regulating system. More specifically, the present disclosure relates to a system for regulating a temperature of interior surfaces of a vehicle.

BACKGROUND OF THE DISCLOSURE

Vehicles typically include heating, ventilation, and air conditioning systems that deliver cooled or heated air to a passenger cabin. Generally, the air is directed into the passenger cabin via air vents. The air vents may be adjustable to direct the air to different locations.

SUMMARY OF THE DISCLOSURE

According to at least one aspect of the present disclosure, a temperature regulating system for interior surfaces of a vehicle includes a heating, ventilation, and air conditioning system. An air register assembly is operably coupled to the heating, ventilation, and air conditioning system to direct air from the heating, ventilation, and air conditioning system to an interior compartment. The air register assembly includes an actuation assembly for adjusting a position of the air register assembly. A target feature is disposed within the interior compartment. The target feature has a contact surface. A temperature sensor is coupled to the target feature. The temperature sensor senses a surface temperature of the contact surface of the target feature. A controller is communicatively coupled with the air register assembly and the temperature sensor. The controller communicates a notification with temperature information received from the temperature sensor. A remote start device is communicatively coupled with the controller. The controller adjusts the position of the air register assembly to direct air across the contact surface of the target feature in response to a remote start signal from the remote start device.

According to another aspect of the present disclosure, a steering wheel temperature regulating system includes a heating, ventilation, and air conditioning system. An air register assembly is operably coupled to the heating, ventilation, and air conditioning system to direct air from the heating, ventilation, and air conditioning system to an interior compartment. The air register assembly includes an actuation assembly for adjusting a position of the air register assembly. A steering wheel assembly is disposed proximate to the air register assembly. The steering wheel assembly includes an actuation assembly to adjust a position of the steering wheel assembly. A controller communicatively coupled with the air register assembly and the steering wheel assembly. The controller adjusts the position of the air register assembly and the position of the steering wheel assembly, such that the air expelled from the air register assembly is directed air across the contact surface of the steering wheel assembly.

According to another aspect of the present disclosure, a method of regulating a vehicle interior surface temperature includes the steps of (1) starting a remote start cycle of a vehicle; (2) adjusting a steering wheel assembly from a drive position to a temperature regulating position; (3) adjusting an air register assembly to direct air across a contact surface of the steering wheel assembly; (4) sensing a surface temperature of the contact surface of the steering wheel assembly; (5) displaying a notification when the surface temperature reaches a predefined surface temperature; and (6) adjusting the steering wheel assembly to the drive position.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION

Additional features and advantages of the presently disclosed device will be set forth in the detailed description which follows and will be apparent to those skilled in the art from the description, or recognized by practicing the device as described in the following description, together with the claims and appended drawings.

Figure 1:
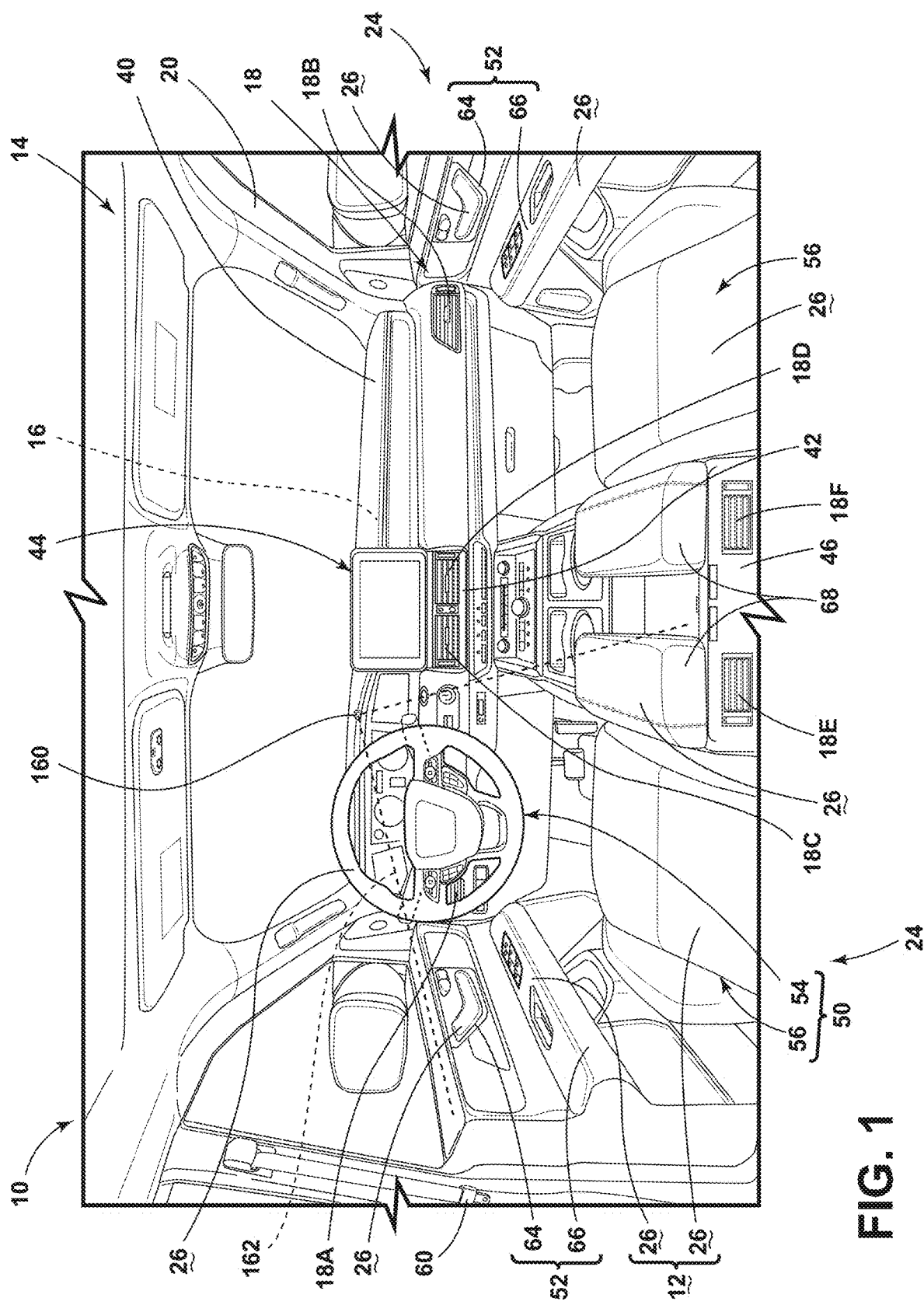
FIG. 1 is a partial rear perspective view of an interior compartment of a vehicle having a temperature regulating system and with target features in drive positions, according to the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

With reference to FIGS. 1-10, reference numeral 10 generally designates a temperature regulating system for interior surfaces 12 of a vehicle 14 that includes a heating, ventilation, and air conditioning (HVAC) system 16. An air register assembly 18 is operably coupled to the HVAC system 16 to direct air from the HVAC system 16 to an interior compartment 20 of the vehicle 14. The air register assembly 18 includes an actuation assembly 22 for adjusting a position of the air register assembly 18. A target feature 24 is disposed within the interior compartment 20. The target feature 24 has a contact surface 26. A temperature sensor 28 is coupled to the target feature 24. The temperature sensor 28 senses a surface temperature of the contact surface 26 of the target feature 24. A controller 30 is communicatively coupled with the air register assembly 18 and the temperature sensor 28. The controller 30 communicates a notification 32 with temperature information received from the temperature sensor 28. A remote start device 34 is communicatively coupled with the controller 30. The controller 30 adjust the position of the air register assembly 18 to direct air across the contact surface 26 of the target feature 24 in response to a remote start signal from the remote start device 34.

Referring to FIG. 1, the temperature regulating system 10 utilizes the air register assembly 18 to direct air from the HVAC system 16 across the contact surface 26 of the target feature 24 to adjust the surface temperature of the contact surface 26. In this way, the target feature 24 is a feature in the interior compartment 20 that the air register assembly 18 targets or directs air to for regulating the surface temperature of the feature. The HVAC system 16 generally cleans, cools, heats, regulates, ventilates, and/or dehumidifies air directed into the interior compartment 20. Accordingly, the air from the HVAC system 16 may be utilized to warm or cool the contact surface 26 to increase comfort for a passenger.

Figure 3:
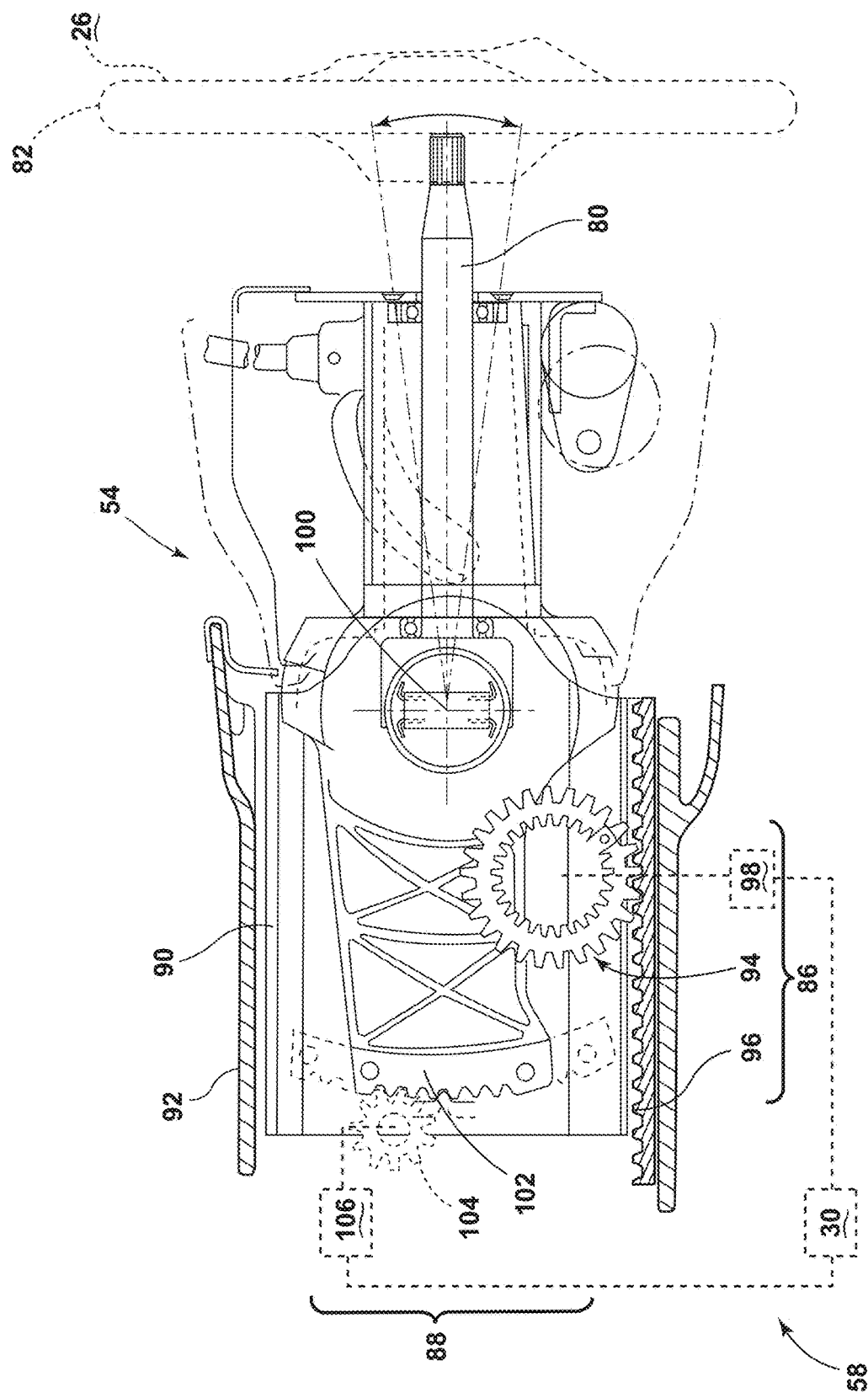
FIG. 3 is schematic cross-sectional view of a steering wheel assembly having a telescoping actuator and a tilt actuator, according to the present disclosure.

The vehicle 14 may have multiple target features 24, each having the contact surface 26. Additionally, the vehicle 14 generally includes multiple air register assemblies 18A-18F, which are collectively referred to herein as the air register assemblies 18. The multiple air register assemblies 18 allow the temperature regulating system 10 to direct air at multiple target features 24 at different locations within the interior compartment 20. The air register assemblies 18 may direct air at multiple target features 24 simultaneously or in sequence. As illustrated in FIG. 1, the vehicle 14 includes side air register assemblies 18A, 18B operably coupled to a dashboard 40 on opposing sides of the interior compartment 20. Central air register assemblies 18C, 18D are operably coupled to a center stack 42 adjacent to a user interface 44. Further, rear air register assemblies 18E, 18F are operably coupled with a vehicle-rearward side of a center console 46. The air register assemblies 18A-18D generally direct air to a first seating row, while the air register assemblies 18E, 18F generally direct air to a second seating row (as best illustrated in FIG. 3).

Referring still to FIG. 1, air expelled from the air register assemblies 18 is directed to the various target features 24 in various locations within the interior compartment 20. There may be different types of target features 24 that receive airflow from at least one of the air register assemblies 18, including independently adjustable target features 50 and fixed target features 52. The independently adjustable target features 50 are operable between a first, drive position within the interior compartment 20 and a second, temperature regulating position within the interior compartment 20. As such, the independently adjustable target features 50 are adjusted or moved between different positions within the interior compartment 20. Examples of the independently adjustable target features 50 include a steering wheel assembly 54 and a seating assembly 56. The steering wheel assembly 54 may tilt (e.g., adjust in a vertical direction) and telescope (e.g., adjust in a fore-aft direction). The seating assembly 56 may adjust in the fore-aft direction. Each of the independently adjustable target features 50 includes an actuation assembly 58 that may automatically adjust the position of the target feature 50 in response to a signal from the controller 30.

In comparison, the fixed target features 52 generally do not move between first and second positions within the interior compartment 20. In this way, the fixed target features 52 may not include the actuation assembly 58. The fixed target features 52 may be manually adjusted (e.g., manually pivoted about a fixed point) or may be stationary. Examples of the fixed target features 52 generally include a seatbelt buckle 60, a door handle 64, a door armrest 66, a console armrest 68, and a gearshift. It is contemplated that the seatbelt buckle 60 may be coupled to the seating assembly 56, in which case the seatbelt buckle 60 may automatically adjust between different positions with the seating assembly 56.

Each target feature 24 includes the contact surface 26 that are interior surfaces 12 of the vehicle 14 that are generally contactable by the user or passenger within the vehicle 14. Accordingly, the contact surface 26 is generally an "A-surface" of the target feature 24. As used herein, the term "A-surface" refers to a surface of any component within the vehicle 14 that is visible or contactable by the passenger within the vehicle 14 when the component is in an assembled state. In comparison, the term "B-surface" refers to a surface of any component within the vehicle 14 that is concealed or not contactable by the passenger within the vehicle 14 when the component is in the assembled state. In this way, the temperature regulating system 10 operates to regulate the surface temperature of the contactable A-surface of the various target features 24 within the vehicle. 14.

Figure 2:
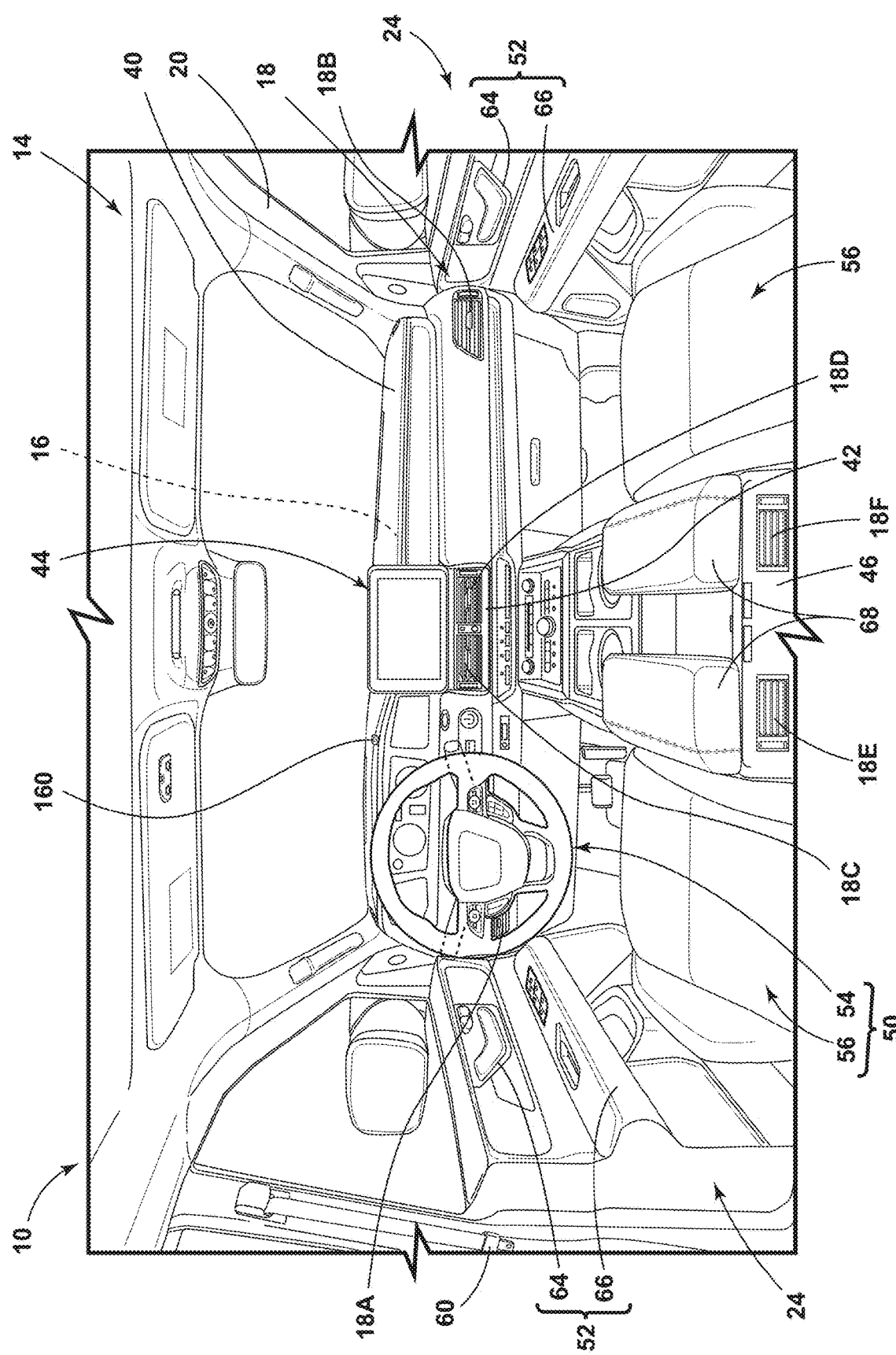
FIG. 2 is a partial rear perspective view of the interior compartment of FIG. 1 with the target features in temperature regulating positions, according to the present disclosure.

Referring still to FIG. 1, as well as FIG. 2, as previously stated, the independently adjustable target features 50, such as the steering wheel assembly 54 and the seating assembly 56, are operable between the first and second positions. For example, in the illustrated configuration, the steering wheel assembly 54 is adjusted from the first, drive position in FIG. 1 to the second, lowered position in FIG. 2 for temperature regulation. The second, lowered position maximizes a surface area of the contact surface 26 that is affected by the air from the air register assemblies 18. The first and second positions are stored by the controller 30. Generally, the drive position is a user-defined position for use while driving or otherwise being positioned in the vehicle 14.

Similarly, the seating assembly 56 may be adjusted from the first, drive position to the second, temperature regulating position closer to the dashboard 40 and the air register assemblies 18. The second position maximizes and optimizes the airflow from the air register assemblies 18 being directed across the contact surface 26 of the seating assembly 56. Accordingly, the controller 30 may adjust each independently adjustable target feature 5 to a second position that maximizes the airflow across the contact surface 26 to more efficiently cool or heat the contact surface 26 in response to the remote start signal.

Referring to FIG. 3, the steering wheel assembly 54 is configured to tilt and telescope. The steering wheel assembly 54 generally includes a steering column shaft 80 operably coupled with each of a steering wheel 82 and the actuation assembly 58. In the steering wheel assembly 54, the actuation assembly 58 includes a telescoping actuator 86, which adjusts the steering wheel assembly 54 in the fore-aft direction, and a tilt actuator 88, which vertically adjusts or tilts the steering wheel assembly 54. The steering wheel assembly 54 includes a telescoping sleeve 90 that adjusts relative to a housing 92 via the telescoping actuator 86. The telescoping actuator 86 includes a first gear 94 operably coupled with the telescoping sleeve 90 and a second gear 96 operably coupled with the housing 92. A motor 98 is operably coupled with the first gear 94 via drive gear, a driveshaft, or other similar features. Activation of the motor 98 by the controller 30 rotates or otherwise moves the first gear 94 to engage the second gear 96, thereby adjusting the telescoping sleeve 90 relative to the housing 92 and telescoping the steering wheel assembly 56.

In addition to telescoping, the tilt actuator 88 vertically adjusts or tilts the steering wheel assembly 54. The steering column shaft 80 pivots about a pivot point 100 through the engagement of a first gear 102 with a second gear 104. The tilt actuator 88 includes a motor 106 operably coupled to the second gear 104. The first gear 102 is operably coupled with the steering column shaft 80. Activation of the motor 106 rotates or moves the second gear 104, which adjusts the first gear 102, and consequently, the steering column shaft 80 in the vertical direction. It is contemplated that the actuation assembly 58 may have any practicable configuration including a rail assembly, a gear assembly, a biasing member, a cam assembly, linear actuators, lever actuators, etc. without departing from the teachings herein. Accordingly, specific configurations of the telescoping actuator 86 and the tilt actuator 88 disclosed herein are exemplary and not meant to be limiting.

Referring again to FIGS. 2 and 3, when the temperature regulating system 10 is activated by the remote start signal, the controller 30 adjusts the position of the steering wheel assembly 54 to maximize the airflow across the contact surface 26 of the steering wheel 82. The controller 30 may adjust the steering wheel assembly 54 in two different directions (e.g., vertically and fore-aft). The steering wheel assembly 54 may be adjusted from the drive position to the temperature regulating position to maximize the surface area affected by the airflow during the remote start cycle to more efficiently adjust the surface temperature of the steering wheel 82.

Figure 4:
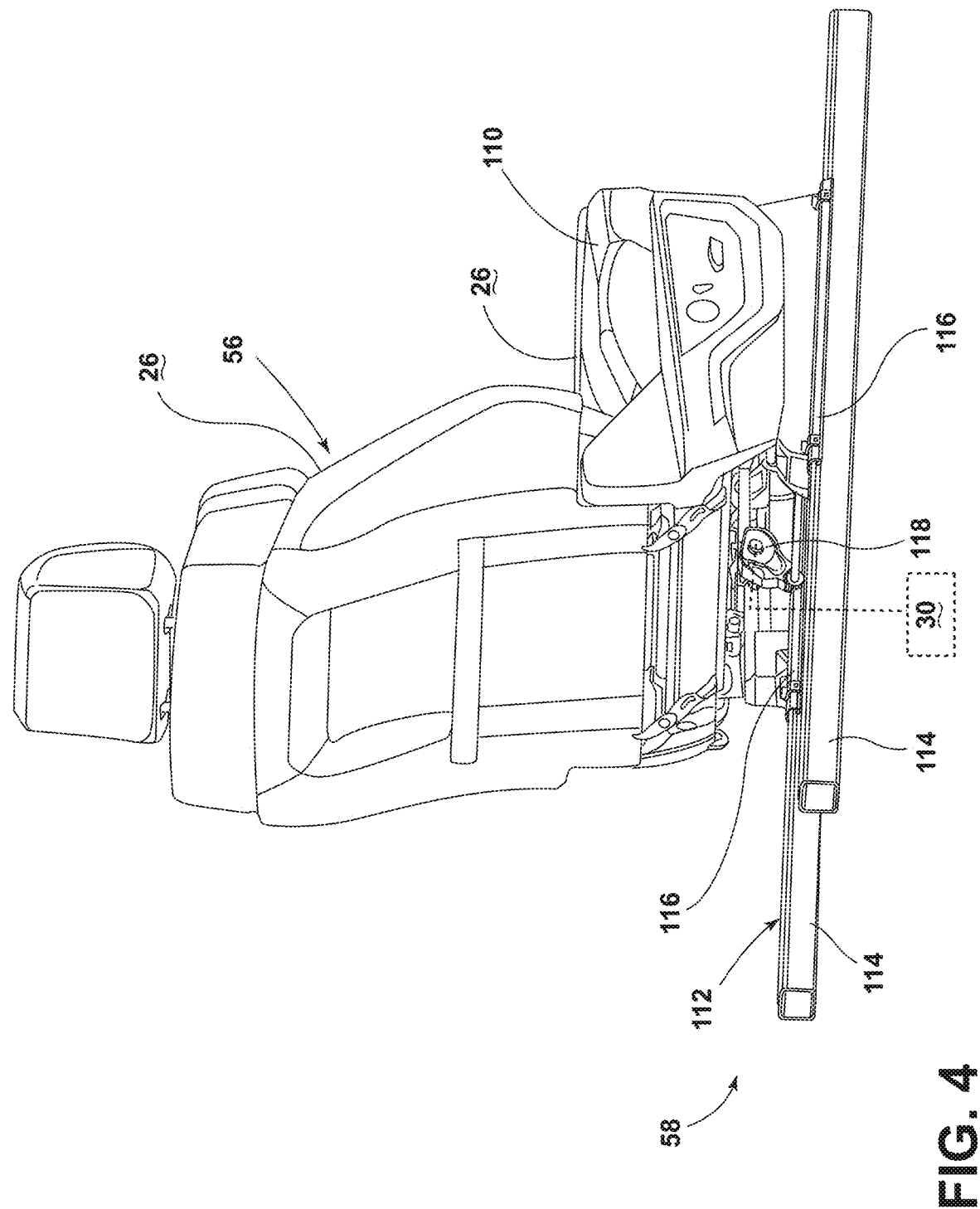
FIG. 4 is a rear perspective view of a vehicle seating assembly disposed with an actuation assembly to adjust a position of the vehicle seating assembly, according to the present disclosure.

Referring to FIG. 4, the seating assembly 56 may also be adjusted from the first, drive position to the second, temperature regulating position that maximizes the airflow from the air register assemblies 18 across the contact surface 26 of the seating assembly 56. The actuation assembly 58 may adjust the seating assembly 56 in response to the remote start signal. A seat base 110 of the seating assembly 56 may be disposed on the actuation assembly 58 configured as a rail assembly 112. Rails 114 of the rail assembly 112 may be coupled to a floor of the vehicle 14 and the seat base 110 may be coupled to rail slides 116. The rail slides 116 may be translated along the rails 114, respectively, in a generally fore-aft direction of the vehicle 14. A motor 118 is operably coupled with the rail assembly 112 to adjust the rail slides 116 relative to the rails 114. Activation of the motor 118 by the controller 30 translates the rail slides 116 and, consequently, the seating assembly 56 between different positions along the rails 114.

In various examples, the rail assembly 112 may include gearboxes operably coupled to each rail 114 with a flex cable engaging each of the gearboxes. The flex cable is operably coupled with the motor 118. Each gearbox may include a first gear operably coupled with the flex cable and a second gear engaged with a threaded rail or worm gear. The first and second gears engage and rotate the threaded rail in response to the operation of the motor 118 to translate the rail slides 116 along the rails 114. It is contemplated that the actuation assembly 58 may have any practicable configuration including a rail assembly, a gear assembly, a biasing member, a cam assembly, etc. without departing from the teachings herein. Accordingly, the configuration of the rail assembly 112 disclosed herein is exemplary and is not meant to be limiting.

Referring again to FIGS. 2 and 4, the seating assembly 56 is adjusted from the drive position to the temperature regulating position in response to the remote start signal. The temperature regulating position is closer to the dashboard 40 relative to the drive position to maximize the airflow across the contact surface 26 of the seating assembly 56. The seating assembly 56 may be adjusted simultaneously with or independently of the steering wheel assembly 54 and other independently adjustable target features 50.

Figure 5:
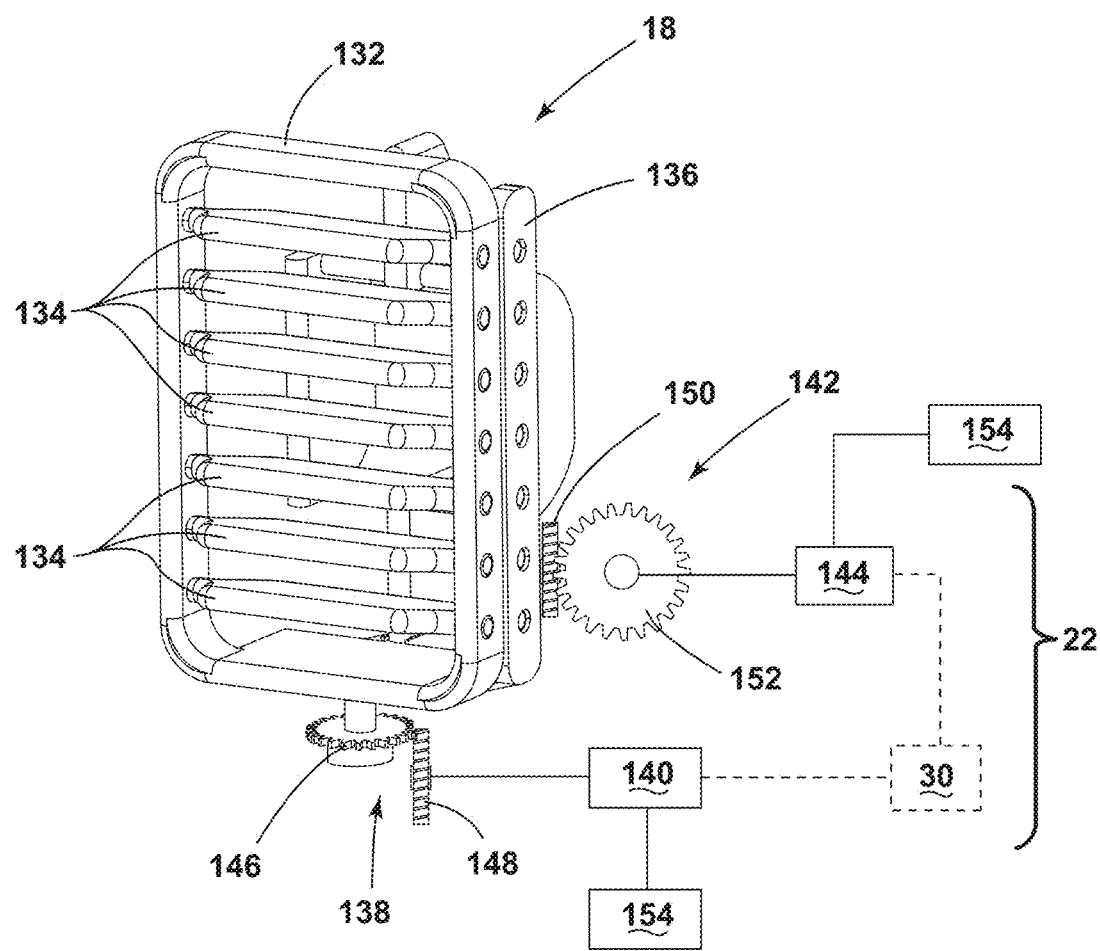
FIG. 5 is a front perspective view of an air register assembly with a frame actuator and a vane actuator, according to the present disclosure.

Referring to FIG. 5, each air register assembly 18 adjusts to more directly provide airflow across the contact surface 26 of the selected target features 24. The air register assembly 18 includes the actuation assembly 22 for adjusting a position of a frame 132 and vanes 134 that are operably coupled to the frame 132. Depending on the configuration of the air register assembly 18, the position of the frame 132 may direct air in a cross-car direction while the vanes 134 adjust air vertically, or alternatively, the frame 132 may adjust air vertically while the vanes 134 adjust air in the cross-car direction. Each vane 134 is coupled to a link bar 136, such that each of the vanes 134 may be rotated about a respective rotational axis simultaneously.

The actuation assembly 22 includes a frame actuator 138 operably coupled with a first motor 140 and a vane actuator 142 operably coupled with a second motor 144. As illustrated, the frame actuator 138 includes a first gear 146 coupled to the frame 132 and a second gear 148 engaging each of the first gear 146 and the first motor 140. The first motor 140 may include a drive shaft, a drive gear, or other similar features to engage the second gear 148. The first motor 140 is activated by the controller 30 and drives the second gear 148 to rotate or otherwise move. The rotation or movement of the second gear 148 causes rotation or movement of the first gear 146. The first gear 146 then rotates the frame 132 between various positions. It is contemplated that the frame actuator 138 may be a gear assembly, a rail assembly, a biasing member, a cam assembly, or other practicable features to rotate the frame 132 about a rotational axis.

The vane actuator 142 is coupled to at least one vane 134 and/or the link bar 136. In the illustrated configuration, the vane actuator 142 includes a first gear 150 coupled to the link bar 136 and a second gear 152 that engages each of the first gear 150 and the second motor 144. The second motor 144 may have a drive gear, a driveshaft, or other similar features for driving rotation or movement of the second gear 152. The vane actuator 142 adjusts the vanes 134 between various angles about the respective rotational axis. In certain aspects, the first and second gears 150, 152 may be configured as a rack and pinion assembly that operates to adjust the link bar 136.

The second motor 144 is operably coupled with the second gear 152 and operates to rotate or otherwise move the second gear 152. The movement of the second gear 152 causes the rotation or movement of the first gear 150 and, consequently, the link bar 136. It is contemplated that the vane actuator 142 may be a gear assembly, a rail assembly, a biasing member, a cam assembly, or other practicable features for adjusting the angle of the vanes 134. Further, if the air register assembly 18 includes a set of rear vanes 134, the actuation assembly 22 may include two vane actuators 142 to independently adjust front vanes 134 and the rear vanes 134. The actuation assembly 22 of the air register assembly 18 operates to adjust the airflow in the cross-car direction and the vertical direction based on the adjustment of the frame 132 and the vanes 134.

Referring still to FIG. 5, each motor 140, 144 may be operably coupled with a position sensor 154 that senses the position of the frame 132 and the vanes 134, respectively. The position information sensed by the position sensor 154 may be communicated to the controller 30. The controller 30 may utilize the position information to determine the current position of the air register assembly 18 and the airflow extending therethrough. In certain aspects, the position sensors 154 may be configured as a Hall-effect sensor included in the motors 140, 144 to sense the specific positions of the frame 132 and the vanes 134, respectively. Hall-effect sensors generally measure a magnitude of the magnetic field directly proportional to an output voltage. It is contemplated that the position sensors 154 may be configured as other proximity sensors, capacitive sensors, variable resistors, or other sensors to determine the position of the frame 132 and the vanes 134.

Referring to FIGS. 1-5, the temperature regulating system 10 operates to cool or heat the contact surface 26 of each target feature 24. The temperature regulating system 10 may also monitor the surface temperature of the target features 24 through communication with the temperature sensors 28, as described later herein. For the independently adjustable target features 50, the target features 50 are adjusted to a position that maximizes the surface area affected by the airflow from the air register assemblies 18. Some air register assemblies 18 are adjusted to direct the airflow across the contact surface 26 of the target features 50 when the target features 50 are in the second position. Other air register assemblies 18 are adjusted to direct airflow across the contact surface 26 of the fixed target features 52 without any adjustment in the position of the target features 52 relative to the air register assemblies 18.

For example, in the illustrated configuration, the steering wheel assembly 54 and the seating assembly 56 may be adjusted to the temperature regulating position with at least one air register assembly 18 directing air across the contact surface 26 of at least one of the steering wheel assembly 54 and the seating assembly 56. Additionally or alternatively, at least one air register assembly 18 may direct air to at least one of the seatbelt buckle 60, the door handle 64, the door armrest 66, and the console armrest 68. Additional features within the interior compartment 20 may be considered target features 24 when targeted to be cooled or warmed by the temperature regulating system 10 without departing from the teachings herein.

The airflow across various contact surfaces 26 may be simultaneously accomplished or may be accomplished in sequence. When accomplished in sequence, the controller 30 may determine the hierarchy of contact surfaces 26 and the air register assemblies 18 may be directed to priority contact surfaces 26 before other contact surfaces 26. It is contemplated that the defogger, generally utilized to defog a front windshield, and demisters, generally configured to demist side windows, may be utilized by the temperature regulating system 10 to direct airflow to various target features 24 in a front of the vehicle 14.

Referring still to FIGS. 1-5, the temperature regulating system 10 includes at least one imager 160 defining a field of view 162 extending in a generally vehicle-rearward direction. In the illustrated configuration, the imager 160 is coupled to the dashboard 40 proximate to the steering wheel assembly 54, and the field of view 162 includes the steering wheel assembly 54 and at least one seating assembly 56. The imager 160 may be any practicable type of image-based sensor, such as a charge coupled device (CCD), a complementary metal oxide semiconductor (CMOS) imager, or any type of color or black-and-white camera.

The imager 160 captures data from within the field of view 162. The data may include image data, such as at least one of a picture, a video, real-time streaming of data, other transmissions of image data, or combinations thereof. The image data may be a single image or multiple images. Additionally or alternatively, the imager 160 may be adjustable. The field of view 162 may be adjustable to be broader, narrower, positionally shifted, or any combination thereof. The imager 160 may receive a signal from the controller 30 based on the data or a user input to adjust an aspect of the imager 160. In various examples, the imager 160 may be adjusted to change the scope of the field of view 162. It is contemplated that the imager 160 includes one or more lenses, which may be adjusted to change the sharpness or quality of the data obtained by the imager 160.

The data captured by the imager 160 within the field of view 162 is communicated to the controller 30. The imager 160 captures position data of the target features 24 and communicates the position data to the controller 30. The controller 30 utilizes the position data from the imager 160 to monitor the position of the target features 24 for potential interactions during movement to the temperature regulating positions. If a potential interaction is detected, the controller 30 halts movement of one or more of the independently adjustable target features 50 by deactivating the respective actuation assemblies 58.

Figure 6:
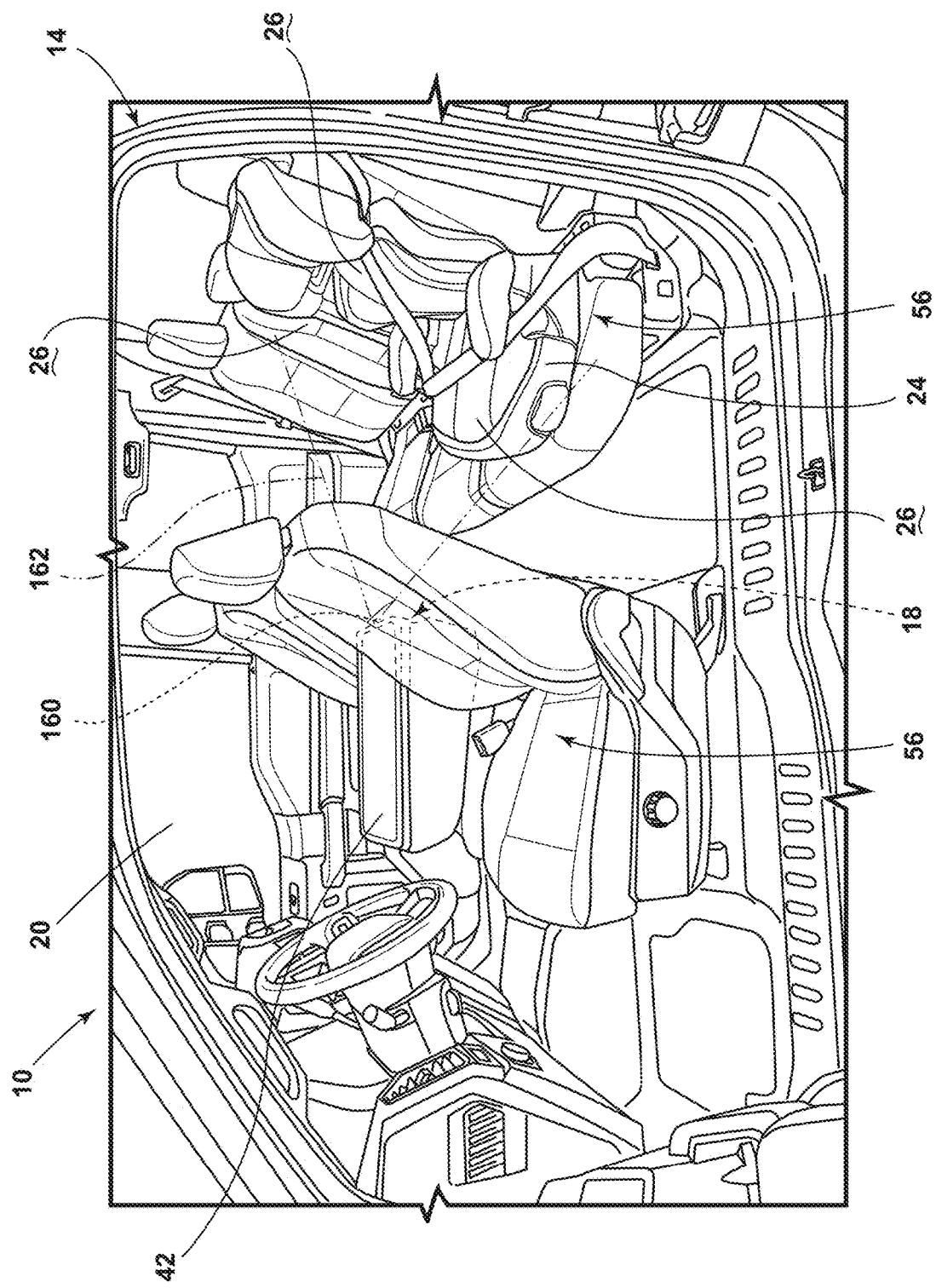
FIG. 6 is a side perspective view of a second seating row of a vehicle having a removable target feature associated with a temperature regulating system, according to the present disclosure.

Referring to FIG. 6, the temperature regulating system 10 may also be utilized within the second seating row of the vehicle 14. The seating assemblies 56 within the second seating row may be adjusted fore and aft as previously described herein. The air register assemblies 18E, 18F (FIG. 1) coupled to the center stack 42 direct air to various contact surfaces 26 in the second seating row. For example, the contact surfaces 26 may be on the seating assemblies 56.

Additionally or alternatively, the temperature regulating system 10 directs airflow to removable target features 24 (e.g., a vehicle accessory) selectively installed in the vehicle 14, such as the illustrated child car seat. An additional imager 160 may be coupled to the center stack 42, or otherwise disposed within the vehicle 14. The imager 160 defines the field of view 162 that extends to capture data within the second seating row. Accordingly, the imager 160 may detect the removable target feature 24 on the seating assembly 56 within the field of view 162, and the controller 30 may direct airflow to the removable target feature 24 in response to receiving the data from the imager 160.

The removable target feature 24 may not be in direct communication with the controller 30. The imager 160 may be utilized to determine the surface temperature of the contact surface 26 of the removable target feature 24 and communicate the temperature information to the controller 30. In such configurations, the imager 160 may include a thermal or infrared sensor that senses or detects infrared energy emitted from the removable target feature 24. At least one of the imager 160 and the controller 30 may convert the detected energy into a temperature reading to determine the surface temperature of the contact surface 26. Accordingly, using the imager 160, the temperature regulating system 10 monitors the surface temperature of various removable target features 24 within the vehicle 14.

Figure 7:
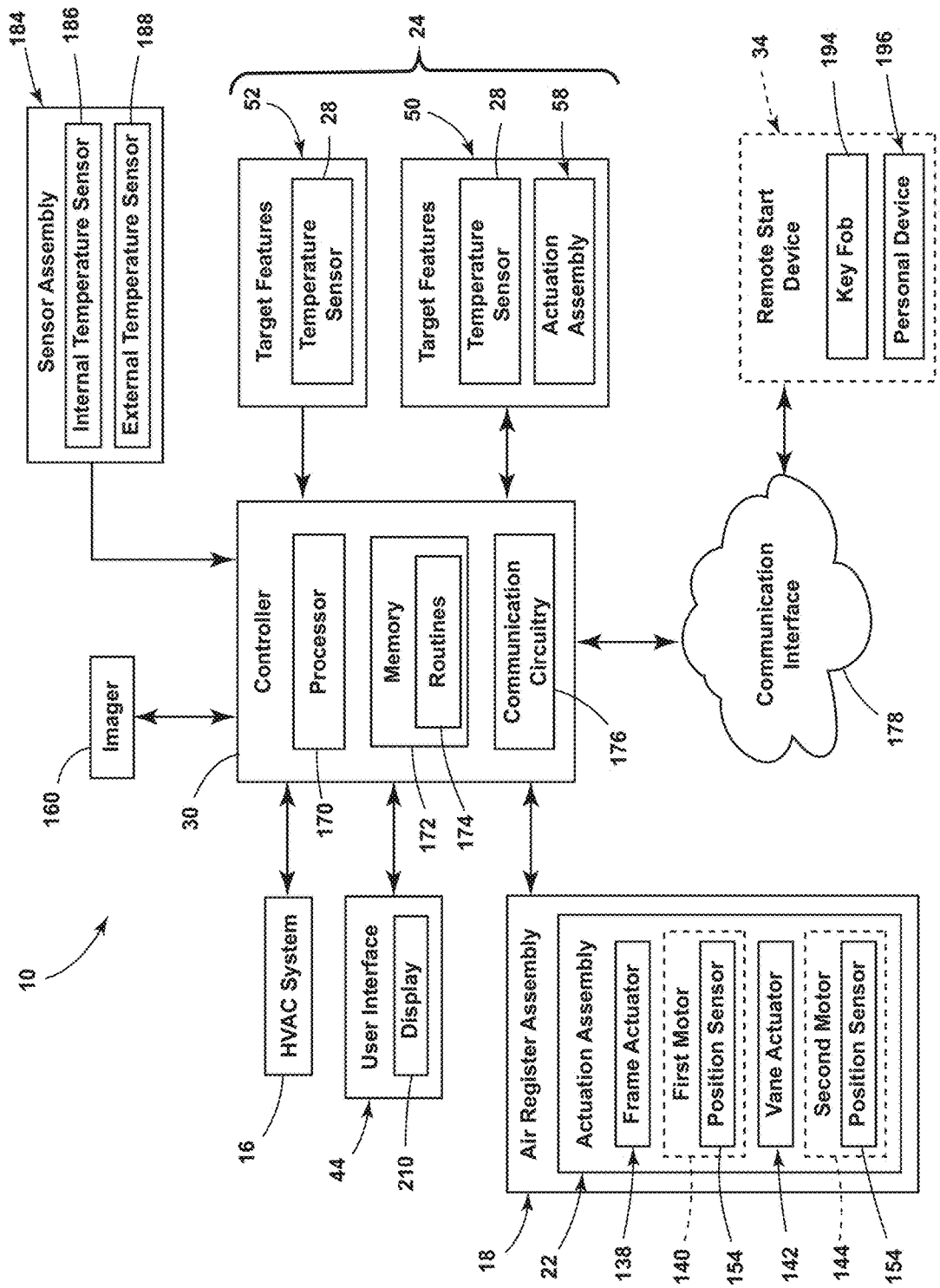
FIG. 7 is a block diagram of a temperature regulating system, according to the present disclosure.

Referring to FIG. 7, the temperature regulating system 10 operates to adjust the surface temperature of the contact surface 26 of the various target features 24 within the interior compartment 20 of the vehicle 14. The controller 30 includes a processor 170, a memory 172, and other control circuitry. Instructions or routines 174 are stored within the memory 172 and executable by the processor 170. The memory 172 may be implemented in a variety of volatile and nonvolatile memory formats. The controller 30 may include various types of control circuitry, digital or analog, and may include the processor 170, a microcontroller, an application specific integrated circuit (ASIC), or other circuitry configured to perform various inputs or outputs, control, analysis, and other functions described herein. The control circuitry may also include communication circuitry 176 to permit communication via a communication interface 178 or other wired or wireless protocols.

The temperature regulating system 10 includes a sensor assembly 184 for sensing various environmental conditions. For example, the sensor assembly 184 may include an internal temperature sensor 186 for sensing the temperature within the interior compartment 20 of the vehicle 14 and an external temperature sensor 188 for sensing temperature external to the vehicle 14. The sensor assembly 184 may also sense other environmental conditions, such as sun load or humidity. The sensor assembly 184 communicates the sensed information (e.g., the internal temperature, the external temperature, etc.) to the controller 30. The controller 30 may include at least one routine 174 for receiving and processing the sensed information and determining whether a cooling mode or a heating mode of the HVAC system 16 should be activated. The heating or cooling mode determines the temperature of the air to be directed to the contact surfaces 26.

The target features 24 generally include the temperature sensor 28 that senses the surface temperature of the contact surface 26. The temperature sensor 28 may be any practicable temperature sensor, such as, for example, a thermistor. Each temperature sensor 28 included in the temperature regulating system 10 communicates the sensed surface temperature (e.g., the temperature information) to the controller 30. For the removable target features 24, the controller 30 receives the temperature information from the imager 160. The controller 30 compares the temperature information with a predefined surface temperature. If the temperature information received by the controller 30 is different from the predefined surface temperature, the controller 30 adjusts the air register assembly 18 to direct the air across the contact surface 26 of the selected target feature 24 or target features 24. The controller 30 may monitor the surface temperature until the sensed or detected surface temperature reaches the predefined surface temperature. The predefined surface temperature may be a temperature or temperature range stored within the memory 172 of the controller 30. The controller 30 may store different predefined surface temperatures for the heating mode and the cooling mode without departing from the teachings herein. The controller 30 adjusts the air register assembly 18, the independently adjustable target features 50, or a combination thereof to direct the airflow from the HVAC system 16 to the contact surface 26 of the various target features 24.

Additionally or alternatively, some or all of the target features 24 may not include the temperature sensor 28. In such configurations, the controller 30 stores information relating to a predefined period of time that relates to a minimum amount of time for the selected target feature 24 to reach the predefined surface temperature. Each target feature 24 may reach the predefined surface temperature in a certain predefined period of time, which is stored within the memory 172 of the controller 30. The controller 30 may monitor the amount of time the air register assembly 18 is directing air to the selected target features 24 and once the predefined period of time has elapsed, the target feature 24 has reached the predefined surface temperature. The predefined period of time may differ for different target features 24 and may differ based on sensed environmental conditions sensed by the sensor assembly 184 (e.g., the higher the internal or external temperature, the greater the predefined period of time).

When the selected target features 24 are adjustable (e.g., the independently adjustable target features 50), the controller 30 adjusts the target features 50 to the temperature regulating position that maximizes the airflow across the contact surface 26. The temperature regulating position for each independently adjustable target feature 50 is stored within the memory 172 of the controller 30. The controller 30 may also monitor the position information received from the imager 160 to prevent interactions between target features 24 during the temperature regulating process.

Referring still to FIG. 7, as previously stated, the controller 30 monitors the sensed or detected surface temperature of the contact surface 26 and compares the sensed or detected surface temperature to the predefined surface temperature. The remote start cycle operates for a predetermined amount of time, which may generally be about 15 minutes. The time may be adjusted by a manufacturer or user.

Accordingly, the surface temperature of the steering wheel 82 reaches the predefined surface temperature within the remote start cycle. The predefined surface temperature may be in a range from about 40° C. to about 55° C., which generally corresponds to a surface temperature that is comfortable to the touch for the passenger or user.

For example, the surface temperature of different locations on the contact surface 26 of the steering wheel 82 generally adjusts at different rates. The surface temperature of the contact surface 26 of the steering wheel 82 reaches the predefined surface temperature prior to the end of the remote start cycle and generally prior to the passenger entering the vehicle 14. Based on the distance from the air register assembly 18 directing air to the steering wheel 82, certain locations reach the predefined surface temperature before other locations. In certain aspects, the locations on the steering wheel 82 reached the predefined surface temperature in the following order: the 12 o'clock position, the 6 o'clock position, the center horn position, the 4 o'clock position, the 10 o'clock position, and the 8 o'clock position. It is contemplated that certain locations on each target feature 24 may reach the predefined surface temperature prior to other locations of the target feature 24 without departing from the teachings herein.

As different positions on the steering wheel 82 reach the predefined surface temperature, the controller 30 may dynamically adjust the air register assembly 18 to more directly blow air across different locations of the steering wheel 82 that have not yet reached the predefined surface temperature (e.g., the 4 o'clock position, the 10 o'clock position, etc.). However, it is contemplated that the air register assembly 18 may not dynamically adjust during the temperature regulation process without departing the teachings herein. It is understood that the data illustrated in FIG. 8 is merely exemplary, and not meant to be limiting.

Referring again to FIG. 7, the controller 30 is generally in communication with the remote start device 34 via the communication interface 178 to receive the remote start signal. The controller 30 and a control unit of the remote start device 34 are each configured for gathering input, processing the input, and generating an output response to the input. The communication interface 178 generally provides bidirectional communication between the controller 30 and the remote start device 34. The communication interface 178 may include one or more various wireless communication mechanisms or network topologies. Exemplary communication networks include wireless communication networks, such as, for example, a Bluetooth® transceiver, a ZigBee® transceiver, a Wi-Fi transceiver, an IrDA transceiver, an RFID transceiver, etc. It is contemplated that the controller 30 and the remote start device 34 may communicate by any suitable technology for exchanging data.

The remote start device 34 may have a variety of configurations. For example, the remote start device 34 may be a key fob 194 associated with the vehicle 14. The user or passenger may press a button or other feature on the key fob 194 that communicates to the controller 30 to initiate the remote start cycle. Additionally or alternatively, the remote start device 34 may be a personal device 196, such as a phone, a tablet, a laptop, a wearable device, etc. In such configurations, the user may select a touch feature or engage a button on the personal device 196 to communicate the remote start signal to the controller 30 via the communication interface 178. The personal device 196 may include an application or software used by the passenger to communicate with the vehicle 14.

Figures 8, 9:
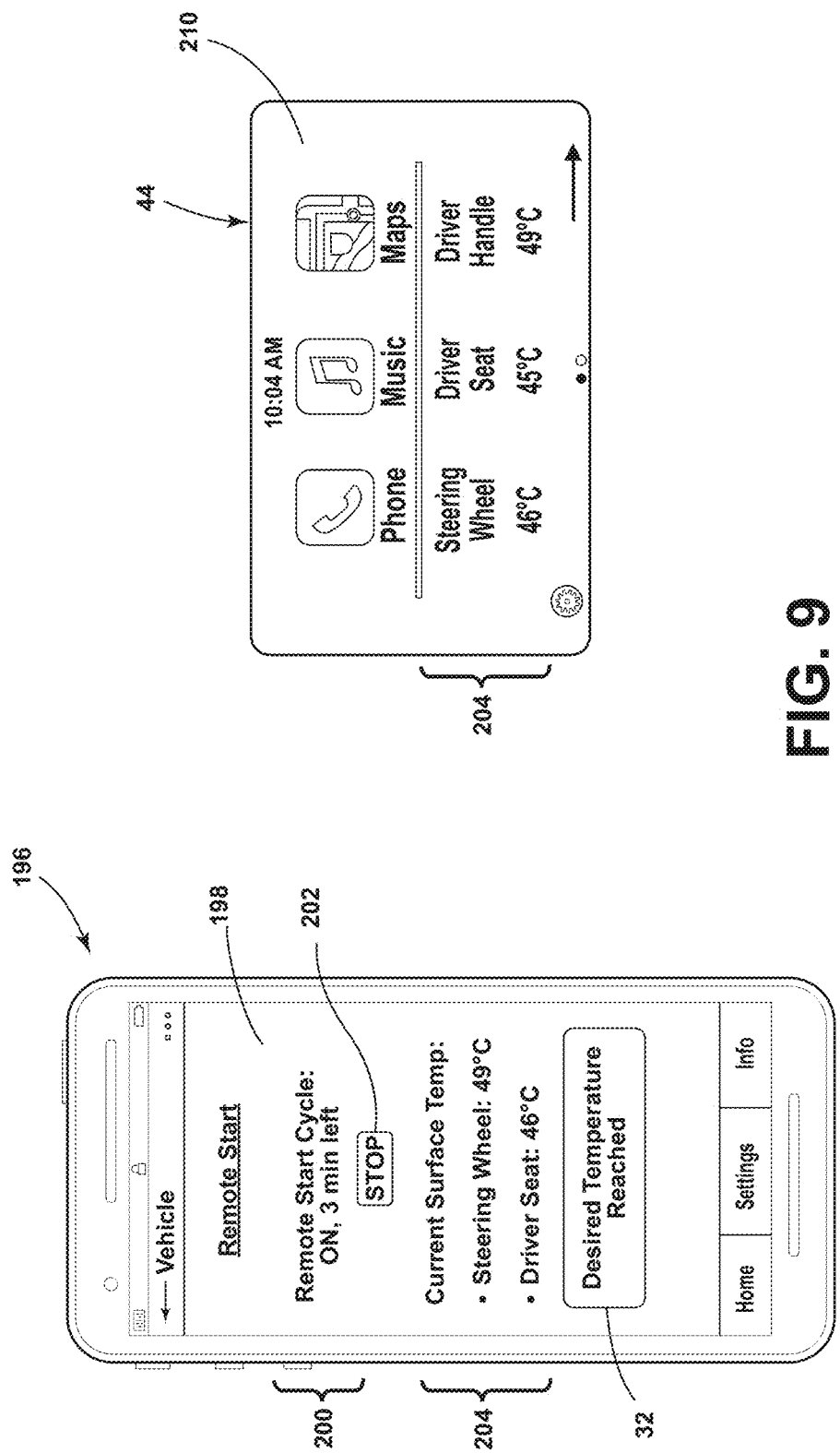
FIG. 8 is a schematic diagram of a display of a personal device having temperature information, according to the present disclosure.
FIG. 9 a schematic diagram of a display of a user interface having temperature information, according to the present disclosure.

Referring again to FIG. 6, as well as FIG. 8, the personal device 196 may include a display 198 for receiving a user input to initiate the remote start cycle of the vehicle 14, as well as view information relating to the temperature regulating system 10. In the illustrated example of FIG. 9, the display 198 includes timing information 200, which indicates whether the remote start cycle has been initiated and, if so, how much time remains before the completion of the remote start cycle. Additionally, the personal device 196 includes a start/stop feature 202 for initiating the remote start cycle or prematurely ending the remote start cycle. Accordingly, if the user selects the stop feature 202 during the remote start cycle, the temperature regulating system 10 may stop and the various independently adjustable target features 50 and the air register assemblies 18 may be readjusted to the drive position as described later herein. The display 198 may also include current temperature information 204, which conveys the current sensed or detected temperature provided by the temperature sensor 28 of one or more of the target features 24. Additionally or alternatively, the personal device 196 may display the notification 32 that the predefined surface temperature has been reached for one or more of the target features 24. Accordingly, the temperature regulating system 10 conveys to the user that the contact surface 26 is at a temperature more comfortable to touch.

Referring again to FIG. 6, as well as FIG. 9, the user interface 44 within the interior compartment 20 may also include a display 210 that conveys a variety of information to the passenger, including information related to the temperature regulating system 10. For example, as illustrated, the display 210 includes the current temperature information 204 of various target features 24. The display 210 may also convey the notification 32 to the passenger that at least one of the target features 24 has reached the predefined surface temperature.

The passengers within the vehicle 14 may confirm the surface temperature on the user interface 44 upon entering the vehicle and may continue to monitor the surface temperature while within the vehicle 14. Monitoring the surface temperature may be advantageous, for example, when the passenger is in the vehicle 14 for an extended period of time. The displays 198, 210 illustrated herein are merely exemplary and are not meant to be limiting.

Figure 10:
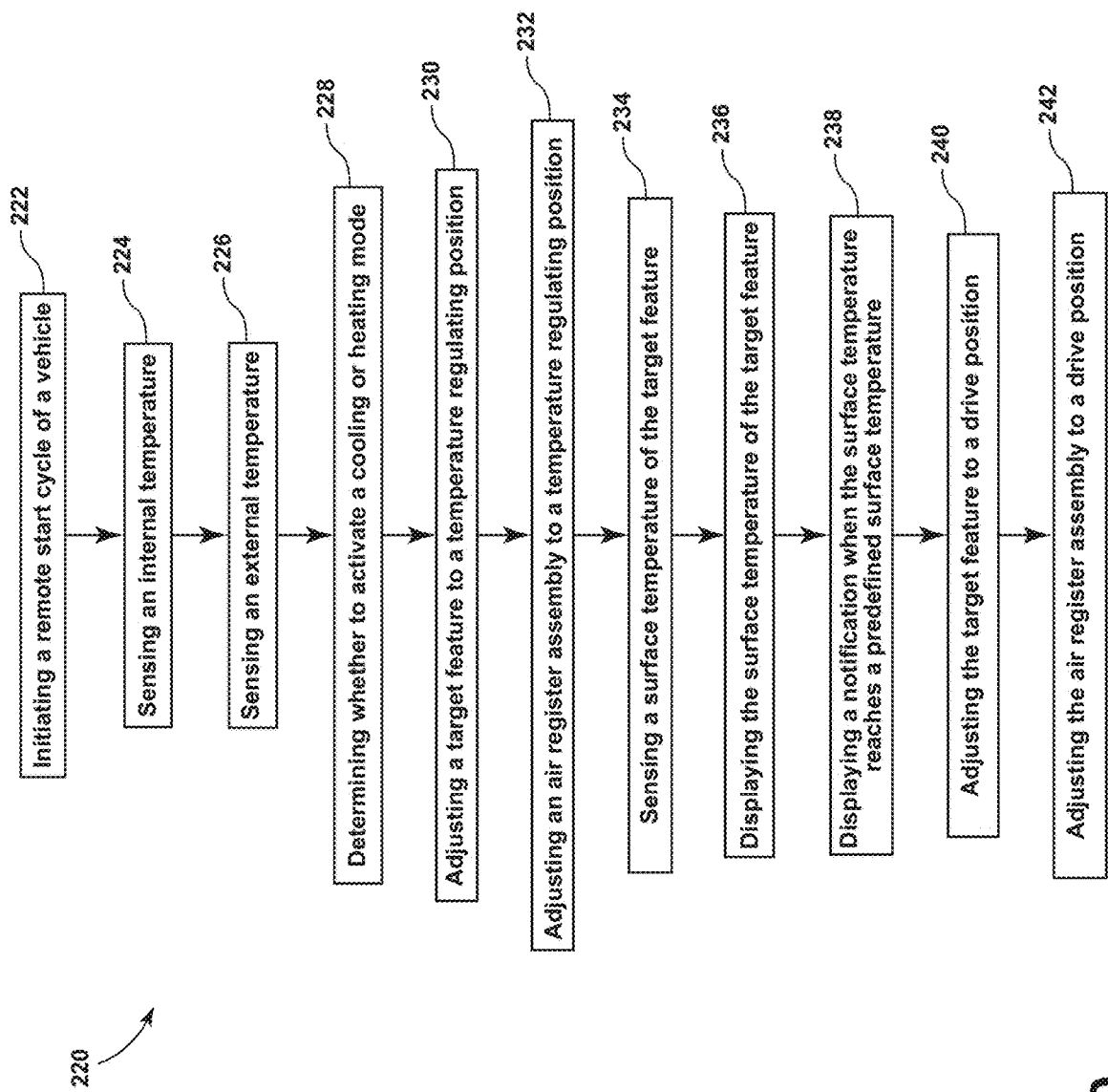
FIG. 10 is a flow diagram of a method of regulating a temperature of interior surfaces of a vehicle, according to the present disclosure.

Referring to FIG. 10, as well as FIGS. 1-9, a method 220 of regulating the interior surfaces 12 of the vehicle 14 includes step 222 of starting the remote start cycle of the vehicle 14. The user may engage the key fob 194 or the personal device 196 (e.g., the remote start devices 34) to activate the remote start cycle. The remote start device 34 communicates the remote start signal to the controller 30, which includes an activation signal for the temperature regulating system 10.

In step 224, the internal temperature within the interior compartment 20 is sensed with the interior temperature sensor 186. The internal temperature sensor 186 is communicated to the controller 30. In step 226, the external temperature sensor 188 senses the external temperature or ambient temperature in an area external to the vehicle 14. The external temperature is also communicated to the controller 30. In step 228, the controller 30 determines whether to activate the cooling or heating mode of the temperature regulating system 10 in response to the sensed information. When the sensed internal and/or external temperatures are above a predetermined temperature, the controller 30 may determine to activate the cooling mode to direct cold or cool air across the contact surfaces 26 of the target features 24. When the sensed internal and/or external temperatures are below a predetermined temperature, the controller 30 may activate the heating mode to direct warm or hot air across the contact surface 26. Accordingly, the temperature regulating system 10 may be used to cool hot surfaces and heat cold surfaces within the vehicle 14 to maximize the comfort of the user.

In step 230, the independently adjustable target features 50 are adjusted to the temperature regulating position from the drive position. For example, the steering wheel assembly 54 and/or the seating assembly 56 may be adjusted from the drive position to the temperature regulating position to allow the air from the air register assembly 18 to be directed across contact surface 26. Additionally, in step 230, the controller 30 may receive the position data from the imager 160. The controller 30 may analyze the position data to determine whether there may be a potential interaction between the target features 24.

In step 232, the air register assembly 18 is adjusted to direct the air to the selected target features 24. The selected target features 24 may be the independently adjustable target features 50, the fixed target features 52, or a combination thereof. Both the frame 132 and the vanes 134 of each air register assembly 18 may be adjusted by the actuation assembly 22 to direct the air across the respective contact surface 26. In step 232, the air register assembly 18 may direct air to a single target feature 24, multiple target features 24 simultaneously, or multiple target features 24 in a predefined sequence.

In step 234, the surface temperature of some or all of the target features 24 are sensed with the respective temperature sensors 28. The sensed surface temperature is communicated to the controller 30 and the controller 30 actively monitors the surface temperature. Further, in step 234, the controller 30 may determine whether any removable target features 24 are within the field of view 162 of the imager 160. If removable target features 24 are detected, the imager 160 communicates the temperature information to the controller 30. Based on user-defined preferences or predefined procedures (e.g., routines 174), the controller 30 may monitor the surface temperature of one, multiple, or all of the target features 24 within the vehicle 14 that are included in the temperature regulating system 10.

In step 236, the surface temperature of the target features 24 are displayed on at least one of the personal device 196 and the user interface 44. The displayed surface temperature may automatically be updated as the controller 30 receives updated temperature information from the temperature sensor 28 or the imager 160. In step 238, the notification 32 is communicated to the user via at least one of the user interface 44 and the personal device 196 when the surface temperature of at least one target feature 24 reaches the predefined surface temperature. One notification 32 may be provided for each target feature 24, or alternatively, one notification 32 may be provided when all of the target features 24 have reached the predefined surface temperature. The notification 32 may be a visual alert, a tactile alert, or an audible alert indicating the user that the contact surfaces 26 of the target features 24 have been cooled or warmed to the predefined surface temperature that maximizes the comfort for the user. Additionally, in step 238, the controller 30 may adjust the air register assemblies 18 to direct air at different target features 24 when the target feature 24 currently being warmed or cooled has reached the predefined surface temperature. In this way, the temperature regulating system 10 may adjust the surface temperature for a greater number of target features 24 relative to the number of air register assemblies 18.

In step 240, the independently adjustable target features 50 that were adjusted for temperature regulation are adjusted to the predefined drive position. The independently adjustable target features 50 may be adjusted to the drive position when the surface temperature reaches the predefined surface temperature, at the completion of the remote start cycle, or at the activation of an ignition of the vehicle 14. The drive position may be stored within the memory 172 of the controller 30 and may be different for different users.

In step 242, the air register assemblies 18 are adjusted to the predefined drive positions. The drive position of the air register assemblies 18 maximizes the airflow comfort for the passenger rather than maximizing the airflow across the contact surface 26 of various target features 24. The air register assemblies 18 may be adjusted when some of all of the target features 24 have reached the predefined target temperature, at the completion of the remote start cycle, or at the activation of an ignition of the vehicle 14. It is understood that the steps of method 220 may be performed in any order, simultaneously, or omitted without departing from the teachings herein.

Referring still to FIGS. 1-10, the temperature regulating system 10 operates to cool or warm the contact surface 26 of various target features 24 during the remote start cycle. In this way, the contact surfaces 26 may be at the predefined surface temperature and generally comfortable to touch when the passenger enters the vehicle 14 at or near the completion of the remote start cycle. However, the passenger may override the temperature regulating system 10. In such circumstances, the passenger may cancel the temperature regulating processes via the personal device 196 or the user interface 44, or alternatively, may start the ignition of the vehicle 14. Upon cancelation of the temperature regulating processes, the temperature regulating system 10 automatically adjusts each component to the drive position.

Use of the present system may provide for a variety of advantages. For example, the contact surfaces 26 of various target features 24 may be cooled or warmed to maximize the comfort of the user or occupant of the vehicle 14. Additionally, the temperature regulating system 10 may operate during the remote start cycle, such that when the user grasps or engages the contact surface 26, the contact surface 26 has reached the predefined surface temperature. The vehicle 14 left in the hot sun or cold weather may have uncomfortable contact surfaces 26 that may be adjusted to a more comfortable temperature prior to the passenger entering the vehicle 14. Additionally, the current surface temperature may be communicated to the user via the user interface 44, the remote start device 34, or combination thereof. Moreover, the controller 30 provides the notification 32 that the surface temperature of one or more of the target features 24 has reached the predefined surface temperature. Further, the temperature regulating system 10 may adjust various independently adjustable target features 50 within the interior compartment 20 to maximize the airflow across the respective contact surface 26. Upon reaching the predefined surface temperature or an override of the temperature regulating system 10, the independently adjustable target features 50 and the air register assemblies 18 are returned to the predefined drive position or another stored position.

Additionally, the target features 24 may include the temperature sensor 28 to actively communicate the surface temperature to the controller 30. Also, the controller 30 may actively monitor the surface temperature of the target features 24 relative to the predefined surface temperature. Further, the temperature regulating system 10 may utilize the imager 160 to prevent interactions between various target features 24 the vehicle 14. Also, the imager 160 may be utilized to sense or detect the surface temperature of various removable target features 24 positioned within the interior compartment 20 allowing the controller 30 to monitor the surface temperature without direct communication from the removable target feature 24. Moreover, the temperature regulating system 10 may be cost and energy efficient. The temperature regulating system 10 may maximize the comfort of the passenger and provide an efficient process that provides comfortably engageable contact surfaces 26 at the predefined surface temperature when the user enters the car at or near the completion of the remote start cycle. Additional benefits or advantages may be realized and/or achieved.

According to various examples, a temperature regulating system for interior surfaces of a vehicle includes a heating, ventilation, and air conditioning system. An air register assembly is operably coupled to the heating, ventilation, and air conditioning system to direct air from the heating, ventilation, and air conditioning system to an interior compartment. The air register assembly includes an actuation assembly for adjusting a position of the air register assembly. A target feature is disposed within the interior compartment. The target feature has a contact surface. A temperature sensor is coupled to the target feature. The temperature sensor senses a surface temperature of the contact surface of the target feature. A controller is communicatively coupled with the air register assembly and the temperature sensor. The controller communicates a notification with temperature information received from the temperature sensor. A remote start device is communicatively coupled with the controller. The controller adjusts the position of the air register assembly to direct air across the contact surface of the target feature in response to a remote start signal from the remote start device. Embodiments of the present disclosure may include one or a combination of the following features:

- the target feature is operable between a first position and a second position via an actuation assembly, and wherein the first position is a greater distance from the air register assembly relative to the second position, and wherein the target feature is adjusted to the second position in response to the remote start signal;
- the target feature is at least one of a steering wheel, a seating assembly, an accessory disposed on the seating assembly, and a seatbelt buckle;
- the target feature is at least one of a door handle, a gearshift, and an armrest;
- an imager coupled to a dashboard within the interior compartment, wherein the imager detects position data of the target feature within a field of view;
- the imager detects the surface temperature of the target feature and communicates the surface temperature to the controller;
- a user interface communicatively coupled to the controller, wherein the user interface displays the notification, and wherein the notification includes at least one of the surface temperature of the target feature and an alert that the surface temperature is a predefined surface temperature; and
- the actuation assembly includes a motor and a gear assembly, wherein the actuation assembly adjusts a frame and a vane of the air register assembly.

According to various examples, a steering wheel temperature regulating system includes a heating, ventilation, and air conditioning system. An air register assembly is operably coupled to the heating, ventilation, and air conditioning system to direct air from the heating, ventilation, and air conditioning system to an interior compartment. The air register assembly includes an actuation assembly for adjusting a position of the air register assembly. A steering wheel assembly is disposed proximate to the air register assembly. The steering wheel assembly includes an actuation assembly to adjust a position of the steering wheel assembly. A controller communicatively coupled with the air register assembly and the steering wheel assembly. The controller adjusts the position of the air register assembly and the position of the steering wheel assembly, such that the air expelled from the air register assembly is directed air across the contact surface of the steering wheel assembly. Embodiments of the present disclosure may include one or a combination of the following features:

- a temperature sensor coupled to the steering wheel assembly, wherein the temperature sensor senses a surface temperature of a contact surface of the steering wheel assembly, and a user interface having a display, wherein the user interface is communicatively coupled with the controller, wherein the surface temperature is displayed on the display;
- the user interface displays a notification when at least one of the surface temperature is a predefined surface temperature and a predefined period of time has elapsed that the air register assembly has directed air to the steering wheel assembly;
- a sensor assembly operably coupled to the controller, wherein the sensor assembly senses an internal temperature within the interior compartment and an external temperature, and wherein the controller determines a temperature of airflow directed across the contact surface in response to at least one of the internal temperature and the external temperature;
- a remote start device communicatively coupled to the controller, wherein the controller adjusts the position of the air register assembly and the position of the steering wheel assembly in response to a remote start signal from the remote start device;
- the actuation assembly of the air register assembly adjusts at least one of a frame and a vane of the air register assembly in response to the remote start signal, and wherein the steering wheel assembly is adjusted in at least one of a vertical direction and a fore-aft direction in response to the remote start signal;
- the remote start device displays a notification when the surface temperature is a predefined surface temperature; and
- the actuation assembly of the steering wheel assembly includes a position sensor that senses a position of the steering wheel assembly and communicates the position information to the controller.

According to various examples, a method of regulating a vehicle interior surface temperature includes the steps of (1) starting a remote start cycle of a vehicle; (2) adjusting a steering wheel assembly from a drive position to a temperature regulating position; (3) adjusting an air register assembly to direct air across a contact surface of the steering wheel assembly; (4) sensing a surface temperature of the contact surface of the steering wheel assembly; (5) displaying a notification when the surface temperature reaches a predefined surface temperature; and (6) adjusting the steering wheel assembly to the drive position. Embodiments of the present disclosure may include one or a combination of the following features:

(1) sensing an internal temperature within an interior compartment; (2) sensing an external temperature; and (3) determining whether to activate a heating mode or a cooling mode of a heating, ventilation, and air conditioning system in response to the internal temperature and the external temperature;

adjusting the air register assembly to a predefined user position when the surface temperature of the steering wheel assembly reaches the predefined surface temperature; and displaying the surface temperature on a user interface.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

The various illustrative logical blocks, modules, controllers, and circuits described in connection with the embodiments disclosed herein may be implemented or performed with application specific integrated circuits (ASICs), field programmable gate arrays (FPGAs), general purpose processors, digital signal processors (DSPs) or other logic devices, discrete gates or transistor logic, discrete hardware components, or any combination thereof designed to perform the functions described herein. A general purpose processor may be any conventional processor, controller, microcontroller, state machine or the like. A processor may also be implemented as a combination of computing devices, e.g., a combination of a DSP and a microprocessor, a plurality of microprocessors, one or more microprocessors in conjunction with a DSP core, or any other such configuration.

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A temperature regulating system for interior surfaces of a vehicle, comprising:
    a heating, ventilation, and air conditioning system;
    an air register assembly operably coupled to the heating, ventilation, and air conditioning system to direct air from the heating, ventilation, and air conditioning system to an interior compartment, wherein the air register assembly includes an actuation assembly for adjusting a position of the air register assembly;
    target features disposed within the interior compartment and including a movable target feature and a fixed target feature, wherein each of the movable target feature and the fixed target feature has a contact surface;
    a temperature sensor included on the movable target feature, wherein the temperature sensor senses a surface temperature of the contact surface of the movable target feature;
    a controller communicatively coupled with the air register assembly and the temperature sensor, wherein the controller communicates a notification with temperature information received from the temperature sensor; and
    a remote start device communicatively coupled with the controller, wherein the controller:
        determines a hierarchy of the contact surfaces of the target features;
        adjusts the position of the air register assembly from an initial position to a temperature regulating position in response to a remote start signal for a remote start cycle from the remote start device and based on the hierarchy;
        adjusts the movable target feature from a drive position to a temperature regulation position in response to the remote start signal such that the air register assembly directs air across the contact surface of the movable target feature;
        adjusts the air register assembly to the initial position in response to termination of the remote start cycle; and
        adjusts the movable target feature to the drive position in response to at least one of the termination of the remote start cycle, the contact surface reaching a predefined temperature, and vehicle ignition activation.

2. The temperature regulating system of claim 1, wherein the movable target feature is operable between the drive position and the temperature regulation position via an actuation assembly, and wherein the drive position is a greater distance from the air register assembly relative to the temperature regulation position.

3. The temperature regulating system of claim 2, wherein the movable target feature is at least one of a steering wheel, a seating assembly, an accessory disposed on the seating assembly, and a seatbelt buckle.

4. The temperature regulating system of claim 1, wherein the fixed target feature is at least one of a door handle, a gearshift, and an armrest.

5. The temperature regulating system of claim 1, further comprising:
an imager coupled to a dashboard within the interior compartment, wherein the imager detects position data of the movable target feature within a field of view.

6. The temperature regulating system of claim 5, wherein the imager detects the surface temperature of the movable target feature and communicates the surface temperature to the controller.

7. The temperature regulating system of claim 1, further comprising:
a user interface communicatively coupled to the controller, wherein the user interface displays the notification, and wherein the notification includes at least one of the surface temperature of the movable target feature and an alert that the surface temperature is a predefined surface temperature.

8. The temperature regulating system of claim 1, wherein the actuation assembly includes a motor and a gear assembly, wherein the actuation assembly adjusts a frame and a vane of the air register assembly.

9. A steering wheel temperature regulating system, comprising:
a heating, ventilation, and air conditioning system;
an air register assembly operably coupled to the heating, ventilation, and air conditioning system to direct air from the heating, ventilation, and air conditioning system to an interior compartment, wherein the air register assembly includes an actuation assembly for adjusting the air register assembly between an initial position and multiple temperature regulating positions;
a steering wheel assembly disposed proximate to the air register assembly, wherein the steering wheel assembly includes an actuation assembly to adjust the steering wheel assembly between a drive position and a temperature regulation position; and
a controller communicatively coupled with the air register assembly and the steering wheel assembly, wherein the controller:
adjusts the steering wheel assembly from the drive position to the temperature regulating position after a start of a remote start cycle;
adjusts the position of the air register assembly from the initial position to a first of the multiple temperature regulation positions in response to the start of the remote start cycle such that the air expelled from the air register assembly is directed across a contact surface of the steering wheel assembly;
dynamically adjusts the air register assembly to subsequent temperature regulation positions of the multiple temperature regulation positions to direct air across different locations on the steering wheel; and
adjusts the steering wheel assembly to the drive position in response to a termination of the remote start cycle.

10. The steering wheel temperature regulating system of claim 9, further comprising:
a temperature sensor coupled to the steering wheel assembly, wherein the temperature sensor senses a surface temperature of the contact surface of the steering wheel assembly; and
a user interface having a display, wherein the user interface is communicatively coupled with the controller, and wherein the surface temperature is displayed on the display.

11. The steering wheel temperature regulating system of claim 10, wherein the user interface displays a notification when at least one of the surface temperature is a predefined surface temperature and a predefined period of time has elapsed that the air register assembly has directed air to the steering wheel assembly.

12. The steering wheel temperature regulating system of claim 9, further comprising:
a sensor assembly operably coupled to the controller, wherein the sensor assembly senses an internal temperature within the interior compartment and an external temperature, and wherein the controller determines a temperature of airflow directed across the contact surface in response to at least one of the internal temperature and the external temperature.

13. The steering wheel temperature regulating system of claim 9, further comprising:
a remote start device communicatively coupled to the controller, wherein the remote start device is configured to initiate the remote start cycle.

14. The steering wheel temperature regulating system of claim 13, wherein the actuation assembly of the air register assembly adjusts at least one of a frame and a vane of the air register assembly in response to the remote start signal, and wherein the steering wheel assembly is adjusted in at least one of a vertical direction and a fore-aft direction in response to the remote start signal.

15. The steering wheel temperature regulating system of claim 13, wherein the remote start device displays a notification when the surface temperature is a predefined surface temperature.

16. The steering wheel temperature regulating system of claim 9, wherein the actuation assembly of the steering wheel assembly includes a position sensor that senses a position of the steering wheel assembly and communicates the position information to the controller.

17. A method of regulating a vehicle interior surface temperature, comprising:
starting a remote start cycle of a vehicle;
adjusting a steering wheel assembly from a drive position to a temperature regulating position;
adjusting an air register assembly to direct air across a first location of a contact surface of the steering wheel assembly;
sensing a surface temperature of the first location of the contact surface of the steering wheel assembly has reached a predefined temperature;
displaying a notification that the surface temperature reaches the predefined surface temperature;
adjusting the air register assembly to direct air across a second location of the contact surface of the steering wheel assembly after the first location reaches the predefined surface temperature;
adjusting the steering wheel assembly to the drive position after at least one of termination of the remote start cycle, the second location reaching the predefined surface temperature, and vehicle ignition activation.

18. The method of claim 17, further comprising:
sensing an internal temperature within an interior compartment;
sensing an external temperature; and
determining whether to activate a heating mode or a cooling mode of a heating, ventilation, and air conditioning system in response to the internal temperature and the external temperature.

19. The method of claim 17, further comprising:
adjusting the air register assembly to a predefined user position when the surface temperature at the second location of the steering wheel assembly reaches the predefined surface temperature.

20. The method of claim 17, further comprising:
displaying the surface temperature on a user interface.

\* \* \* \* \*